United States Patent [19]

Ziemek et al.

[11] 4,151,238

[45] Apr. 24, 1979

[54] FOAM INSULATED CONDUCTOR

[75] Inventors: Gerhard Ziemek, Langenhagen; Bernd Eilhardt, Hannover, both of Fed. Rep. of Germany

[73] Assignee: Kabel-und Metallwerke Gutenhoffnungshuette AG, Fed. Rep. of Germany

[21] Appl. No.: 771,087

[22] Filed: Feb. 23, 1977

[30] Foreign Application Priority Data

Feb. 24, 1976 [DE] Fed. Rep. of Germany ....... 2607362

[51] Int. Cl.² .............................................. B29D 27/00
[52] U.S. Cl. .................................. 264/45.5; 264/45.9;
264/55; 264/174; 264/DIG. 14; 264/DIG. 18; 264/DIG. 65
[58] Field of Search ....................... 264/45.9, 46.1, 54, 264/DIG. 18, 53, 45.5, DIG. 14, 55, DIG. 65, 174; 427/119, 120

[56] References Cited

U.S. PATENT DOCUMENTS

| | | | |
|---|---|---|---|
| 3,068,532 | 12/1962 | Higgins | 264/45.9 |
| 3,098,831 | 7/1963 | Carr | 264/DIG. 18 |
| 3,098,832 | 7/1963 | Pooley et al. | 264/DIG. 18 |
| 3,250,731 | 5/1966 | Buhl et al. | 264/DIG. 18 |
| 3,410,932 | 11/1968 | Woodson et al. | 264/45.9 |
| 3,896,198 | 7/1975 | Utumi et al. | 264/54 X |

OTHER PUBLICATIONS

"Wire and Cable Coater's Handbook," First Edition, Wilmington, Del., E. I. DuPont de Nemours and Co., (Inc.), Plastics Dept., c 1968, pp. 4-7; 49.
"Handbook of Chemistry and Physics," 52nd Edition, Robert C. Weast, Boltor, Cleveland, Ohio, The Chemical Rubber Co., c 1971, p. F-133.

Primary Examiner—Philip Anderson
Attorney, Agent, or Firm—Marn & Jangarathis

[57] ABSTRACT

Foam insulated conductor is produced by heating the conductor to a temperature at which the conductor retains sufficient heat to effect crosslinking and foaming of a polymer composition, followed by extruding the polymer composition onto the conductor, with the crosslinking and foaming being effcted by the retained heat.

6 Claims, 2 Drawing Figures

FIG.1
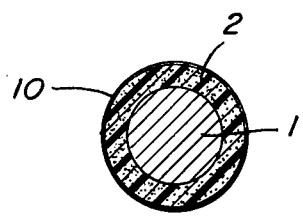
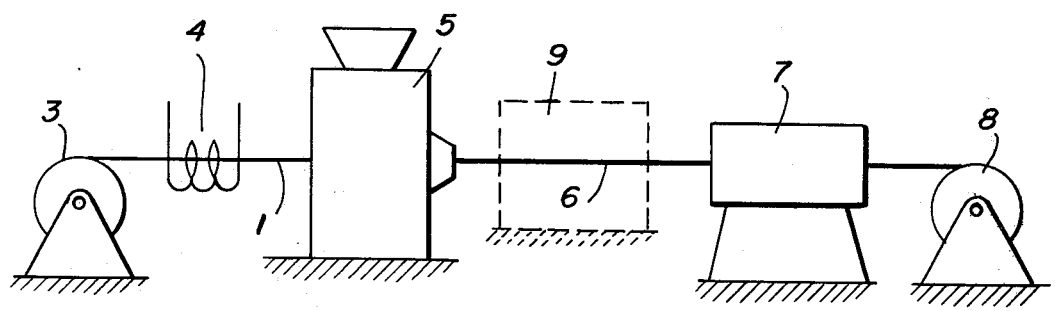
FIG. 2

FOAM INSULATED CONDUCTOR

The subject invention relates to insulated conductors, and more particularly, to the production of conductors insulated with a foamed polymer.

Cables with foamed insulation are used, for example, as core leads for communication cables. The foaming improves the insulating properties as a result of the improved dielectric constant of the entrapped air. The crosslinking of the insulating material before foaming results in a higher degree of foaming, a lower density, a finer foam structure and a lower layer thickness.

A method is known from German Pat. No. 1,088,566 wherein the insulating material is applied onto the wire by immersing the wire into the insulating material. The foaming is carried out by supplying outside heat.

Such method is limited to relative large insulating thicknesses and the degree of foaming is relatively lower. Furthermore, such an insulation is disadvantageous in that the surface of the core leads is rough which results in damage to the core leads as well as to the guide parts of the standing machine during the further processing of the core leads into a communication cable. Also, the insulating material must be dissolved in a solvent agent which has to be removed after the insulating material is applied to the wire.

In the German laid open Pat. No. 2,404,821, a method is disclosed wherein the plastic material is applied in powdered form onto a heated wire and the layer thickness is subsequently adjusted by drawing the insulated wire through a nozzle. The insulated wire is then further heated to affect crosslinking and foaming. This known method permits an even circumferential layer thickness of the insulating material which is only made possible at high costs and slow drawing off speed.

It is therefore an object of subject invention to provide a method for applying a crosslinkable and foamable insulation having a circumferential even layer thickness onto a wire at a high drawing off speed.

The principal object of the present invention is to provide an improved method for producing a foam insulated conductor.

In accordance with the present invention, a conductor, such as a metal wire, is heated to a temperature at which the conductor retains sufficient heat to effect crosslinking and foaming of a subsequently applied polymer composition, followed by application of an unfoamed polymer composition containing the polymer to be foamed, crosslinking agent and foaming agent, with the polymer being crosslinked and foamed, subsequent to the application, by the heat retained by the conductor.

The polymer composition is preferably applied by the use of an extruder, with the extruder preferably including means for applying thin layers of the unfoamed composition to provide a uniform layer thickness both before and after the crosslinking and foaming.

In accordance with the invention, it is possible to provide a foam insulated conductor at high draw-off speeds in the order of those used for making core leads. In addition, the overall process is simplified in that no additional apparatus or steps are required for crosslinking and foaming in that the heat retained by the conductor is employed to effect the crosslinking and foaming.

The invention will be further described with respect to the accompanying drawing, wherein:

FIG. 1 shows a sectional view through a cable with foamed insulation; and

FIG. 2 schematically shows a device for performing the method of the invention.

Referring to FIG. 1, there is shown a conductor in the form of a copper wire 1 which is insulated with a foamed plastic material 2, which is preferably polyethylene. The foam insulated wire is prepared by use of the device shown in FIG. 2.

Referring to FIG. 2, a metal conductor in the form of wire 1 is drawn off from a drum 3 and fed into a heating station 4 wherein the wire is heated to a temperature at which sufficient heat is imparted to the wire 1 that the wire subsequent to application of a polymer to be crosslinked and foamed retains sufficient heat for effecting the crosslinking and foaming. The heated wire is fed into an extruder 5 which contains the plastic material with added foaming and crosslinking agents. The plastic material is applied in an even layer thickness onto the wire and discharges from extruder 5 as cable 6. Due to the previous heating of wire 1 to a high temperature, generally over 200° C., the plastic layer is first crosslinked and subsequently foamed, whereby a foamed insulation is obtained with the advantages mentioned at the introduction of this application. After foaming, cable 6 is fed into a cooling station and is subsequently wound onto a cable drum 8.

With the aforedescribed method, cables with foamed insulation can be made which are crosslinked and foamed with the heat emitted from the wire. The outer skin 10 of the insulation is generally smooth and unfoamed in that as a result of the insulating effect of the applied polymer composition such outer skin is generally not heated by the retained heat of the wire to a temperature at which crosslinking and foaming is effected. If a completely foamed insulation is desired, a heating zone 9 is installed subsequent to extruder 5 wherein the insulation is additionally heated from the outside to a temperature at which crosslinking and foaming of the outer skin portion is effected; i.e., a temperature of more than 200° C. This additional heating assures that the insulating layer foams without an outer skin.

The specific temperature to which the conductor or metal wire must be heated so that the conductor retains sufficient heat for effecting crosslinking and foaming is dependent on the material from which the conductor is formed and the size of the conductor. Thus, a wire of smaller cross sectional area must be heated to a temperature higher than a wire of larger cross sectional area in order to have sufficient heat retention. For a wire of about 1 mm, the wire should be heated to a temperature in excess of 200° C.

The foaming agent and crosslinking agent for the polymer are preferably selected in a manner such that crosslinking is effected prior to the foaming in that, as hereinabove noted, an improved foam insulation is provided by effecting crosslinking prior to foaming.

In general, the unfoamed plastic material is applied to the conductor to provide a thickness in the order of 30 to 50 $\mu$m, with the resulting foam thickness generally raging up to about 200 $\mu$m. The density of the foam is generally in the order of 200 kg/m$^3$, with the dielectric constant being in the order of 1.3 to 1.5.

The invention will be further described with respect to the following examples:

EXAMPLE I

A mixture having the following composition is used:
100 parts soft polyethylene (Lupolen 1810 H)

0.8 parts dicumyl peroxide
3.0 parts of foaming agent (ADCF)

This admixture is applied onto wire 1 in extruder 5, with the wire having been preheated to a temperature between 220° C. and 240° C. depending on the cross diameter of the wire.

EXAMPLE II

If a harder insulation is desired the following composition may be used as described in Example I.

50 parts soft polyethylene (Lupolen 1810 H)
50 parts hard polyethylene
0.8 parts dicumyl peroxide
3.0 parts of foaming agent (ADCF)

The present invention is particularly advantageous in that the use of a wire preheated to a temperature at which crosslinking and foaming is effected in combination with the application of the insulating components by the use of an extruder results in the production of a foam insulated conductor at a high draw-off speed. The extruder presses the composition onto the conductor in both the radial and axial direction independent of the drawing speed whereby the drawing speed need not be limited.

Numerous modifications and variations of the present invention are possible in light of the above teachings and, therefore, within the scope of the appended claims, the invention may be practiced otherwise than as particularly described.

What is claimed is:

1. A process for producing a foam insulated conductor, comprising:
   heating a conductor to a temperature of over 200° C. at which the conductor retains sufficient heat to effect heating of a subsequently applied polymer composition to a temperature at which crosslinking and foaming of the polymer is effected:
   applying to the conductor in an extruder a polymer composition containing a polymer to be foamed and crosslinked, crosslinking agent and foaming agent, said polymer composition being applied in an uncrosslinked and unfoamed form; and
   subsequent to the application, heating the polymer composition on the conductor by the heat content of the conductor to a temperature at which the polymer is crosslinked and foamed to produce a crosslinked, foamed insulated conductor.

2. The process of claim 1 wherein crosslinking is effected prior to foaming.

3. The process of claim 1 and further comprising additionally heating the applied composition from the outside to effect crosslinking and foaming of the outer skin portion.

4. The process of claim 1 wherein the polymer is polyethylene.

5. The process of claim 4 wherein the conductor is a wire.

6. The process of claim 5 wherein the unfoamed polymer composition is applied at a uniform layer thickness of from 30 to 50 μm.